(12) United States Patent
Kino et al.

(10) Patent No.: US 7,314,233 B2
(45) Date of Patent: Jan. 1, 2008

(54) HEAD-PROTECTING AIRBAG DEVICE (75) Inventors: Masao Kino, Aichi-ken (JP); Takanobu Ikeda, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 387 days.

(21) Appl. No.: 10/878,413

(22) Filed: Jun. 29, 2004

(65) Prior Publication Data
US 2005/0023807 A1 Feb. 3, 2005

(30) Foreign Application Priority Data
Jul. 7, 2003 (JP) ............................. 2003-271347

(51) Int. Cl.
*B60R 21/213* (2006.01)
*B60R 21/237* (2006.01)

(52) U.S. Cl. ............................. 280/730.2; 280/743.1; 280/743.2

(58) Field of Classification Search ............. 280/730.1, 280/730.2, 743.1
See application file for complete search history.

(56) References Cited

U.S. PATENT DOCUMENTS

| | | | | |
|---|---|---|---|---|
| 5,921,575 A | * | 7/1999 | Kretschmer et al. ...... | 280/728.2 |
| 5,992,882 A | * | 11/1999 | Ito et al. ................... | 280/743.1 |
| 6,209,907 B1 | * | 4/2001 | Fischer ..................... | 280/728.3 |
| 6,224,087 B1 | * | 5/2001 | Stutz et al. ............... | 280/728.2 |
| 6,237,941 B1 | * | 5/2001 | Bailey et al. ............. | 280/730.2 |
| 6,276,712 B1 | * | 8/2001 | Welch et al. ............. | 280/730.2 |
| 6,375,214 B1 | * | 4/2002 | Nishikaji .................. | 280/728.2 |
| 6,439,598 B1 | * | 8/2002 | Braun et al. .............. | 280/728.2 |
| 6,666,475 B2 | * | 12/2003 | Kippschull ............... | 280/730.2 |
| 2003/0234523 A1 | * | 12/2003 | Henderson et al. ...... | 280/730.2 |

FOREIGN PATENT DOCUMENTS

JP          A-9-207698          8/1997

* cited by examiner

*Primary Examiner*—Paul N. Dickson
*Assistant Examiner*—Timothy D. Wilhelm
(74) *Attorney, Agent, or Firm*—Posz Law Group, PLC (57) ABSTRACT

In the head-protecting airbag device according to the present invention, an airbag folded and housed in the upper edge of an opening inside the vehicle deploys downward to cover the opening. The airbag includes a plurality of cells juxtaposed in the front-rear direction each of which, when fed with inflation gas, extends downward from the upper edge of the opening and inflates to separate its interior and exterior walls. Above the cells is located a gas passage extending in the front-rear direction, via which the cells are communicated with one another. The gas passage includes a joint port for introducing inflation gas into the airbag. In each of the cells, the interior wall and exterior wall are respectively bellows-folded on alternate crest folds projecting in the surface and valley folds recessing inside the cell, such that the airbag is folded to bring its lower edge close to its upper edge. The head-protecting airbag device is able to deploy the airbag swiftly.

8 Claims, 8 Drawing Sheets

HEAD-PROTECTING AIRBAG DEVICE

The present application claims priority from Japanese Patent Application No. 2003-271347 of Kino et al, filed on Jul. 7, 2003, the entirety of which is hereby incorporated into the present application by reference.

BACKGROUND OF THE INVENTION

1. Field of the Invention

The present invention relates to a head-protecting airbag device whose airbag folded and housed in the upper edge of an opening inside the vehicle is deployable downward to cover the opening.

2. Description of Related Art

It is known in the prior art that an airbag is folded in a cactus fashion for quick deployment, as disclosed in JP 9-207698 A.

This folding method is a method of forming bellows-folds, i.e., alternate crest and valley folds on each of an interior wall and exterior wall of the airbag.

Although this folding method is suitable for relatively small airbags mounted on a seat, it is hard to apply the same to a head-protecting airbag which is elongate in the front-rear direction for covering an opening of vehicle.

SUMMARY OF THE INVENTION

The present invention contemplates to solve the above-mentioned problem, and therefore, has an object to provide a head-protecting airbag device capable of deploying quickly. The head-protecting airbag device according to the present invention includes an airbag folded and housed in the upper edge of an opening inside the vehicle and deployable downward for covering the opening, and an inflator for supplying inflation gas to the airbag. The airbag includes an interior wall and an exterior wall, and a gas admissive portion provided between the interior wall and the exterior wall and capable of admitting inflation gas. The gas admissive portion includes a plurality of cells, a gas passage and a joint port. The cells are juxtaposed in the front-rear direction of the vehicle, and when fed with inflation gas, each of the cells extends downward from the upper edge of the opening and inflates while separating the interior wall and exterior wall in the interior-exterior direction of the vehicle. The gas passage extends in the front-rear direction of the vehicle above the cells, and communicates each of the cells with one another. The joint port is located in the gas passage and connected with the inflator. In each of the cells, the interior wall and exterior wall are respectively folded in a bellows-fashion on alternate crest folds projecting in the surface and valley folds recessing inside the cell, such that the airbag is folded to bring its lower edge close to its upper edge, and is housed in the upper edge of the opening.

In the airbag of the head-protecting airbag device according to the present invention, a portion that inflates and covers the opening is constituted by a plurality of cells juxtaposed in the front-rear direction, so that each of the cells can be folded-up separately without interfering with one another. Accordingly, the entirety of the airbag elongate in the front-rear direction is smoothly folded up to bring its lower edge close to its upper edge, even if the airbag is folded by so-called cactus folding in which each of the interior wall and the exterior wall is alternately bellows-folded on crest folds projecting in the surface and on valley folds recessing inside the cell such that the lower edge is brought close to the upper edge.

After being housed in the upper edge of the opening, if the airbag is fed with inflation gas, inflation gas flows into each of the cells via the joint port and the gas passage, and directly hits the lower edge of the cell, so that the individual cells are able to deploy swiftly.

In the head-protecting airbag device, therefore, the airbag elongate in the front-rear direction is able to be folded by cactus-folding that enables a swift deployment, and is able to deploy swiftly when fed with inflation gas.

In the airbag, contiguous cells are desirably joined at least in the lower side with each other so as not to be separated from each other in the front-rear direction.

If the cells of the airbag are joined at the lower side with one another as above, a tension in the front-rear direction is exerted in the entire lower edge of the airbag, so that the occupant restraint performance in the lower part of the airbag is improved.

In this case, if the airbag is provided along its upper edge with a plurality of mounting portions for attachment to the vehicle body, it will be appreciated that a foremost mounting portion and a rearmost mounting portion are formed in band shapes extending from the lower end of a foremost cell and a rearmost cell as the airbag is completely deployed, respectively, forward and rearward and away from the airbag.

With this construction, joints of the cells and the foremost and rearmost mounting portions cooperatively help exert a tension in the front-rear direction in the lower edge of the airbag, so that the occupant restraint performance in the lower part of the airbag is further improved.

Moreover, if the cells of the airbag are joined at more than one positions in the vertical directions of the airbag as completely deployed, the individual cells are further joined and united to one another in the front-rear direction.

It is desired that joints of the cells are located in front and rear edges of the cells and in valley folds of each of the interior wall and exterior wall.

This is because positions of crest folds and valley folds in the interior wall and the exterior wall can be staggered from those of crest and valley folds in the front and rear edges of each of the cells of the airbag by half pitches. That is, front and rear ends of each of the bottoms of the valley folds in the interior wall and exterior wall become tops of crest folds in the front and rear edges of each of the cells. Since the tops of crest folds in the front and rear edges of the cell are formed in all of the cells, and the tops are close to each other, the tops of contiguous cells are easily connected to each other even when the airbag is cactus-folded. Moreover, joints like this may be located at more than one positions in the vertical direction in the front and rear edges of each of the cells. In this case, the cells are further joined and united to one another in the front-rear direction. Furthermore, if tops of crest folds in the front and rear edges of each of the cells are joined to one another, clearances between the tops are smaller when the airbag is folded-up. Under this condition, greater tension is exerted in the front-rear direction of the cells when the cells are inflated, so that the occupant restraint performance of the airbag is further improved.

The airbag is desirably provided between each of the contiguous cells with a slit extending from the lower edge of the airbag to the vicinity of the gas passage.

With this construction, each of the cells is folded smoothly without interfering with one another.

When the airbag is folded-up, it is desired that each of the cells has its bellows-folded portions pile in the interior-exterior direction of the vehicle and that, in the gas passage, the interior and exterior walls of the airbag are individually folded on folds along the front-rear direction of the vehicle, and located to wrap the bellows-folded portions of the cells in interior and exterior of the cell.

With this construction, inflation gas flown into the gas passage via the joint port of the airbag is able to press down the lower edges of the individual cells immediately, and therefore, the airbag is able to deploy further swiftly.

Without considering above point, it will also be appreciated that the interior wall and the exterior wall in the gas passage are closely overlaid on each other, and bellows-folded together as a single sheet on alternate crest and valley folds.

Each of the cells of the airbag may be formed into a shape elongate in the front-rear direction, as well as a vertically elongate shape. If the cells are elongate in the front-rear direction, each of the cells is desirably provided with a tether for restraining a clearance between the interior wall and exterior wall, such that the cells do not bulge.

In this case, the tether is desirably formed into either a linear shape extending in the front-rear direction, or a plurality of points arranged in the front-rear direction. With a tether like this, each of the cells elongate in the front-rear direction is folded smoothly if each of the interior wall and exterior wall is folded in a bellows fashion alternately on crest folds projecting in the surface and on valley folds recessing inside the cell in a part of each of the cells below the tether, and each of the interior wall and exterior wall is folded on alternate crest folds and valley folds in the interior and exterior of the bellows-folded portion of the lower part, respectively, in a part of each of the cells above the tether.

DESCRIPTION OF PREFERRED EMBODIMENTS

Preferred embodiments of the present invention are described below with reference to the accompanying drawings. However, the invention is not limited to the embodiments disclosed herein. All modifications with in the appended claims and equivalents relative thereto are intended to be encompassed in the scope of the claims.

Figure 1:
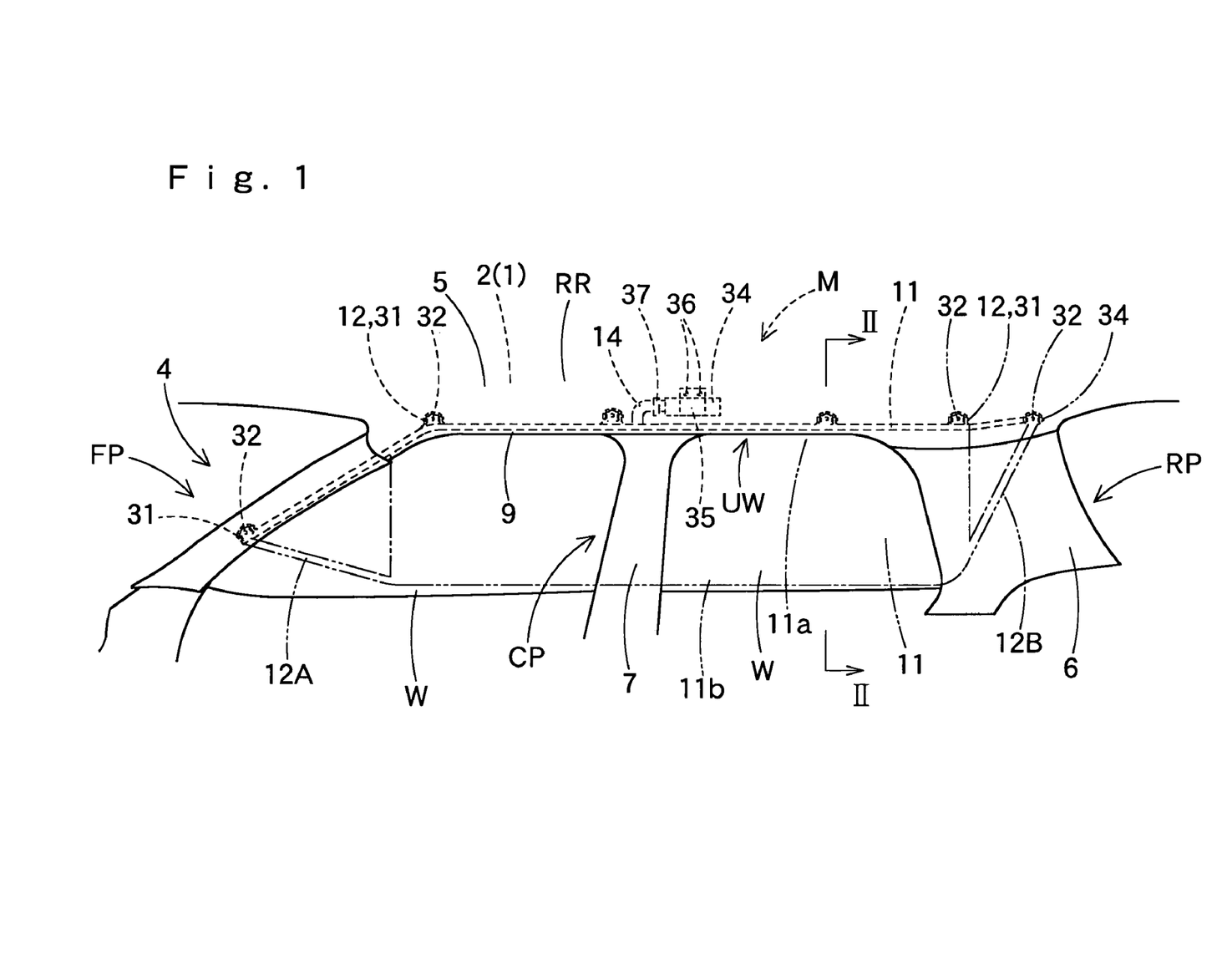
FIG. 1 is a front view of an embodiment of the head-protecting airbag device according to the present invention as mounted on the vehicle.
Figure 2:
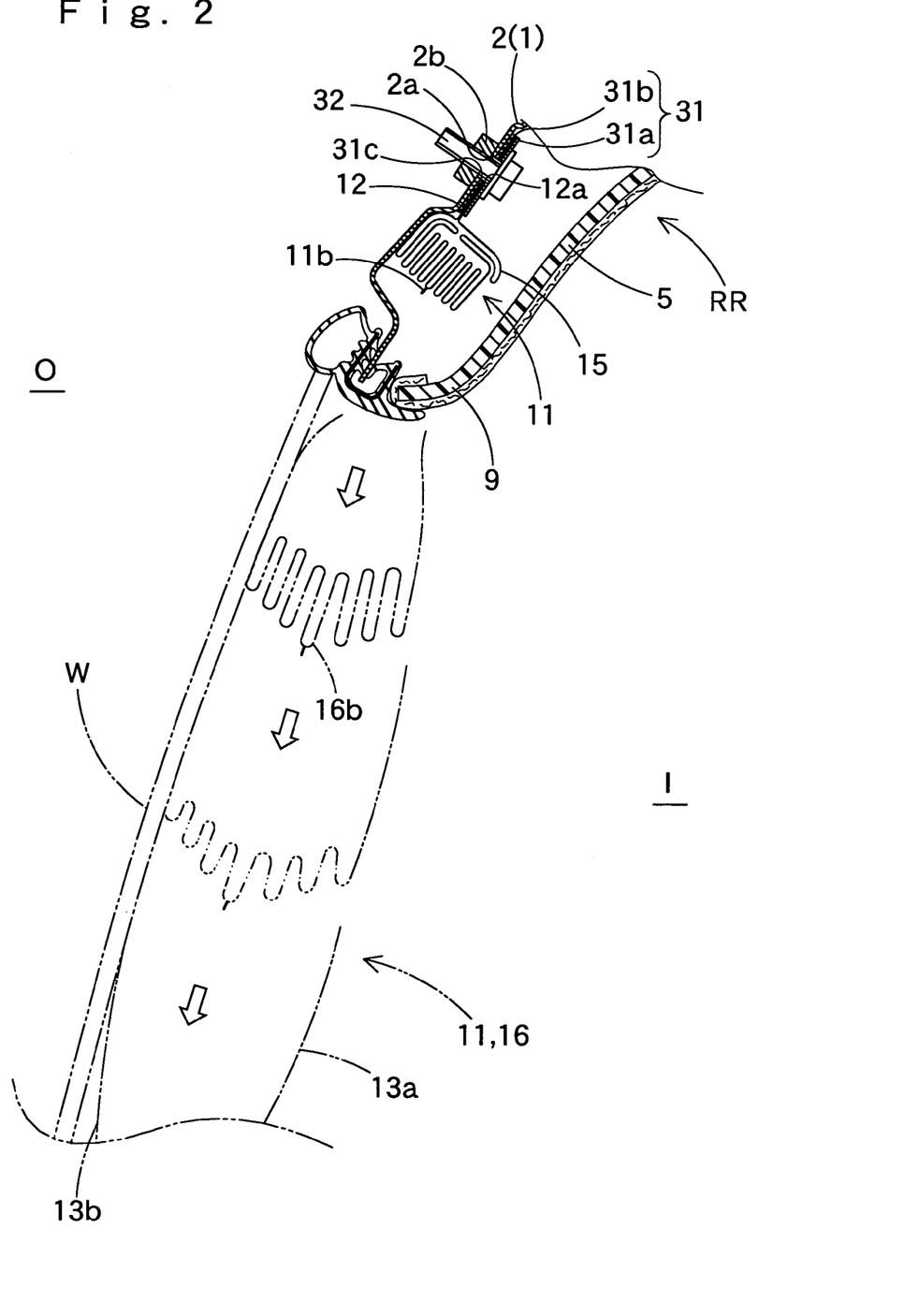
FIG. 2 is a vertical section of the head-protecting airbag device of FIG. 1, taken along line II-II in FIG. 1.

Referring to FIGS. 1 and 2, ahead-protecting airbag device M according to the present invention locates a folded airbag 11 along the upper edge UW of an opening W of doors and windows inside the vehicle, i.e., in the lower edge of a front pillar FP, in the lower edge of a roof side rail RR, and in an upper area of a rear pillar RP.

The head-protecting airbag device M includes an airbag 11, an inflator 34, mounting brackets 31 and 35, and an airbag cover 9.

As shown in FIG. 1, the inflator 34 has a cylindrical shape and is adapted to supply inflation gas to the folded airbag 11. A joint port 14 of the airbag 11 is mounted around the inflator 34, and thus the inflator 34 is joined with the joint port 14 by a cramp 37.

The bracket 35 made of sheet metal is adapted to cramp the inflator 34 sheathed with the joint port 14 of the airbag 11 from outside, and is secured to the inner panel 2 made of sheet metal as part of the vehicle body 1 with two bolts 36 in the roof side rail RR.

Referring to FIGS. 1 and 2, each of the mounting brackets 31 made of sheet metal is adapted to cramp each of later-described mounting portions 12 of the airbag 11. Each of the mounting brackets 31 consists of an inner plate 31a located toward the interior I and an outer plate 31b located toward the exterior O of the mounting portion 12, respectively. Each of the plates 31a and 31b has a through hole 31c corresponding to the mounting hole 12a of each of the mounting portions 12. Each of the mounting portions 12 is secured to the inner panel 2 utilizing a bolt 32 which is put through the mounting hole 12a and the through holes 31c to be fastened into a nut 2b attached in the periphery of a mounting hole 2a of the inner panel 2.

Referring to FIGS. 1 and 2, the airbag cover 9 is constituted by lower edge portions of a pillar garnish 4 arranged in the front pillar FP and a roof head lining 5 arranged in the roof side rail RR. The front pillar garnish 4 and the roof head lining 5 are made from synthetic resin, and are secured to the inner panel 2 as part of vehicle body 1 in the interior I of the front pillar FP and the roof side rail RR, respectively. The roof head lining 5 is arranged extendedly from an upper area of the front pillar FP to an upper area of the rear pillar RP, via an upper area of the center pillar CP or a middle pillar.

Figure 3:
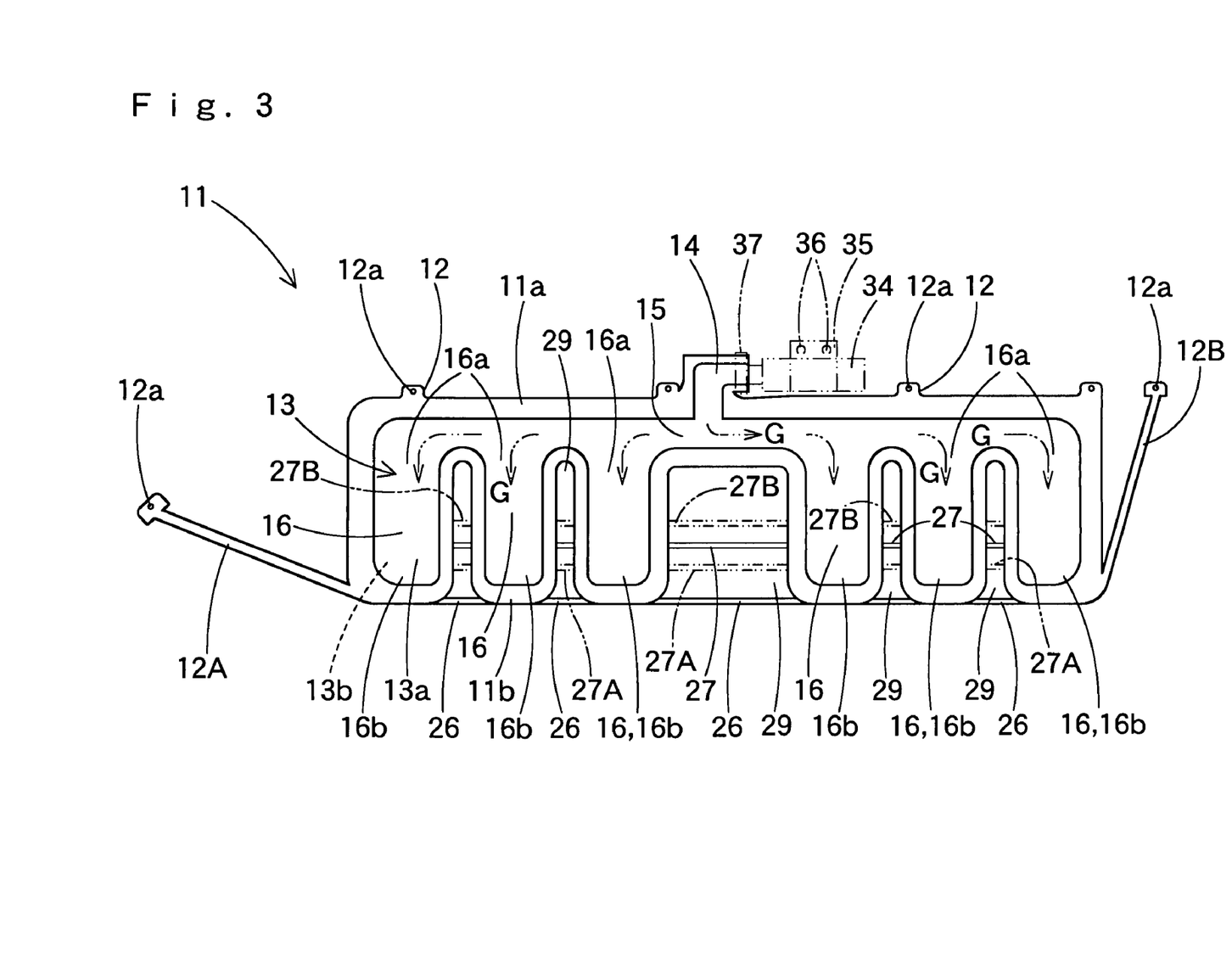
FIG. 3 is a front view of an airbag used in the head-protecting airbag device of FIG. 1, as flatly developed.

The airbag 11 is formed by hollow-weaving method, and is housed in a folded state in the upper edge UW of the opening W. When fed with inflation gas G from the inflator 34, the airbag 11 is developed from the folded state and covers the opening W and interior I of the pillar garnishes 6 and 7 of each of the pillars RP and CP, as shown in FIGS. 1 to 3.

The airbag 11 includes a gas admissive portion 13 that admits inflation gas therein. The airbag 11 is provided along its upper edge 11a with a plurality of mounting portions 12 for attachment of the airbag 11 to the inner panel 2 as part of vehicle body 1. Each of the mounting portions 12 has amounting hole 12a into which the mounting bolt 32 is inserted. As shown in FIG. 3, each of the foremost mounting portion 12A and the rearmost mounting portion 12B is formed in a band shape extending obliquely upward from the lower ends of later-described cells 16, in a manner of going away from the airbag 11, and is provided at the leading end with a mounting hole 12a.

The gas admissive portion 13 is provided in the middle of the front-rear direction of the upper periphery 11a of the airbag 11 with a tubular joint port 14 projecting rearward to be joined with the inflator 34. When admitting inflation gas G from the joint port 14 and completing inflation, the gas admissive portion 13 separates the wall 13a in the interior I and the wall 13b in the exterior O in the interior-exterior direction of the vehicle.

The gas admissive portion 13 includes a plurality of (six, in the illustrated embodiment) vertical cells 16 that are juxtaposed in the front-rear direction, and deployable to cover the opening W and the interior I of the pillar garnishes 6 and 7 of each of the pillars RP and CP. Each of the cells 16 is adapted to inflate in a vertical rod shape upon deployment of the airbag 11, and is communicated at the upper end (upper edge) 16a with a gas passage 15 extending in the front-rear direction along the upper periphery 11a of the airbag 11. The gas passage 15 is connected with the joint port 14 in substantially middle of its front-rear direction. The inflation gas G from the joint port 14 flows through the gas passage 15 and flows from the upper edge 16a to the lower edge 16b in each of the cells 16, and thus inflates the entire gas admissive portion 13.

Figure 5:
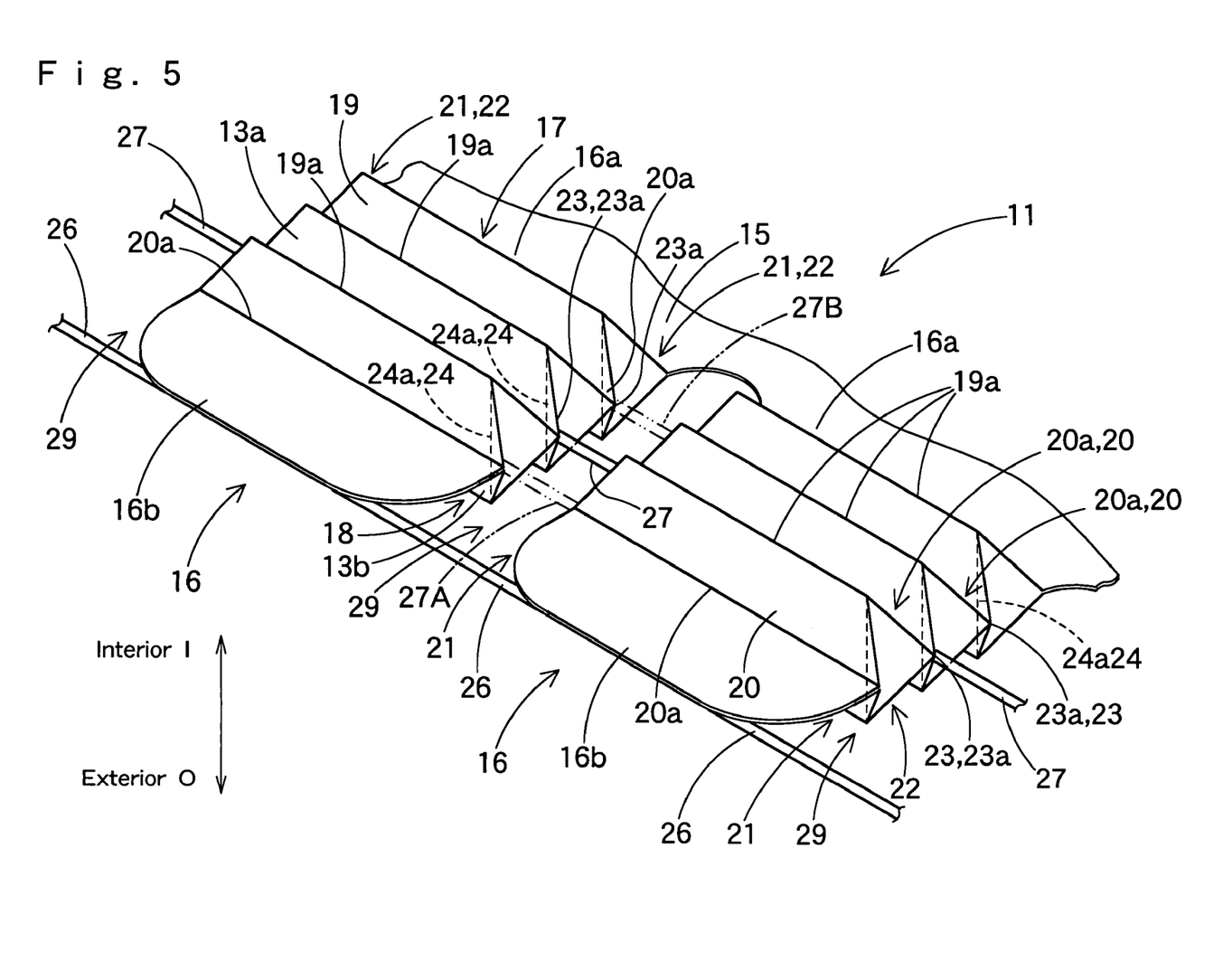
FIG. 5 is a schematic perspective view illustrating a joined state of vertical cells of the airbag of FIG. 3.

In the airbag 11, between each of the vertical cells 16 is a slit 29 extending from the lower edge 11b of the airbag 11 to the vicinity of the gas passage 15 for facilitating cactus-folding. Moreover, the cells 16 are joined with one another at predetermined positions by flexible band-shaped joint members 26 and 27 so as not to be separated in the front-rear direction because of the slits 29. As shown in FIG. 5, the joint members 26 are adapted to join the lower ends 16b of the contiguous vertical cells 16, while each of the joint members 27 is located in a position in an extension of a bottom 20a of a valley fold 20 in the interior and exterior walls 13a and 13b of each of the cells 16, and on top 23a of a crest fold 23 in a bellows-folded portion 22 formed in an edge portion 21 in the front-rear direction of each of the cells 16.

As shown in FIG. 4, in each of the vertical cells 16 of the airbag 11, the interior wall 13a and exterior wall 13b are respectively folded alternately on crest folds 19 projecting in the surface and on valley folds 20 recessing inside the cell 16, such that bellows-folded portions 17 and 18 are formed, and the lower edge 16b (11b) is brought closer to the upper edge 16a (11a). Moreover, when completely folded, the bellows-folded portions 17 and 18 pile along the interior-exterior (I-O) direction, as shown in FIG. 4E.

Referring to FIG. 5, in the front and rear edge portions 21 of each of the vertical cells 16, each of the bellows-folded portions 22 is constructed such that extensions of bottoms 20a of valley folds 20 in the bellows-folded portions 17 and 18 in the interior and exterior walls 13a and 13b lead to tops 23a of crest folds 23 in the edge portion 21, while the tops 19a of the crest folds 19 in the bellows-folded portions 17 and 18 lead to bottoms 24a of valley folds 24 in the edge portion 21.

Figure 4A:
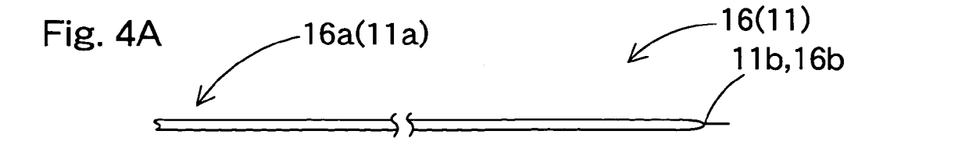
FIGS. 4A to 4F illustrate folding processes of the airbag of FIG. 3.
Figure 4B:
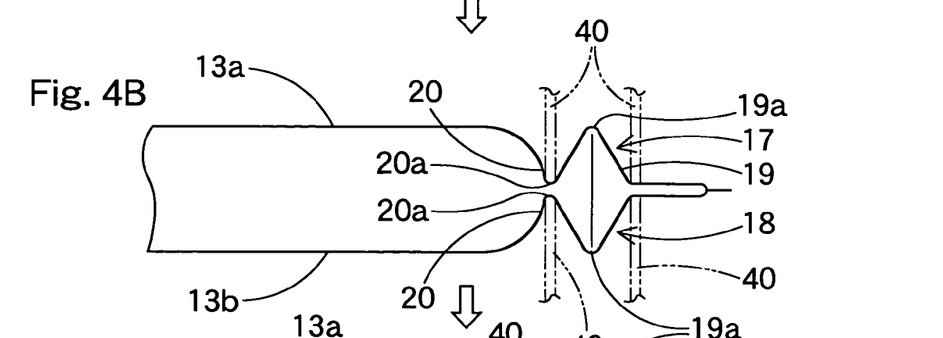
Figure 4C:
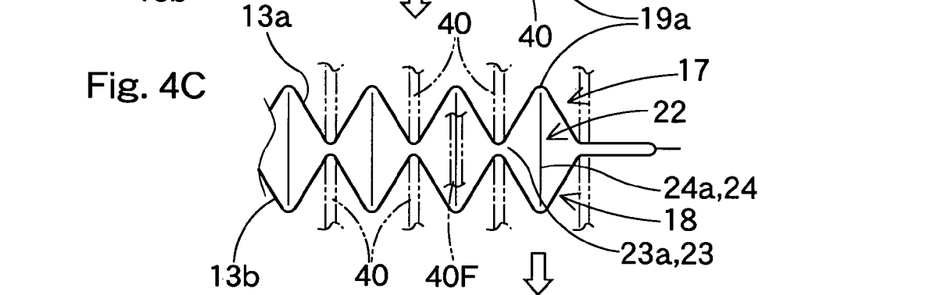
Figures 4D, 4E, 4F:
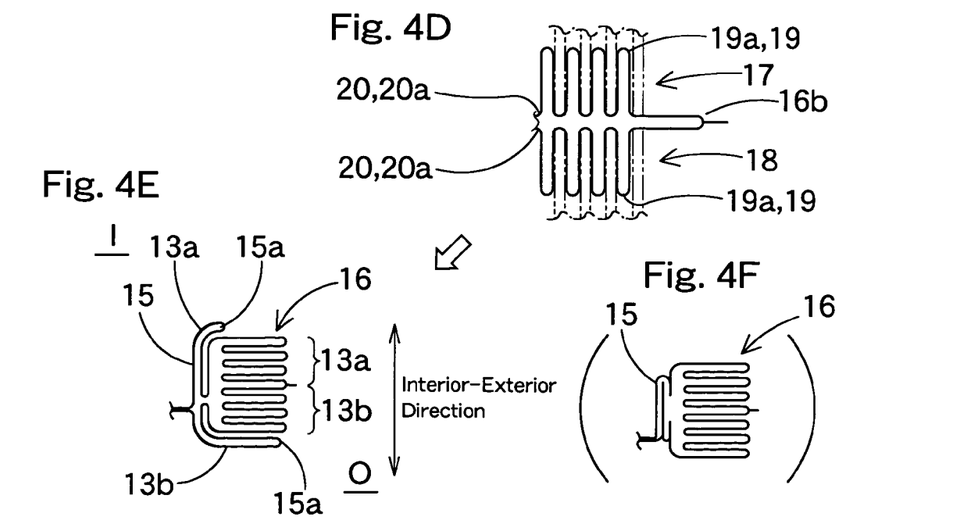

To describe the folding work of the airbag 11 more specifically, firstly, the airbag 11 is filled with air such that the cells 16 are inflated to a certain extent, as shown in FIGS. 4A, 4B and 4C. Plate-shaped press members 40 and 40F are pressed onto the bottom portions 20a and 24a of each of the valley folds 20 and 24 to form the bellows-folded portions 17, 18 and 22. Subsequently, the airbag 11 is deflated to bring the individual press members 40 and 40F close to one another, as shown in FIG. 4D, and the press members 40 and 40F are removed. If the bellows-folded portions 17 and 18 are piled in the interior-exterior direction of the vehicle, the airbag 11 is folded up as shown in FIG. 4E. The press members 40F are applied to the front and rear edge portions 21, and dislocated from the press members 40 by half pitches.

In the area of the gas passage 15, the interior and exterior walls 13a and 13b are respectively folded on folds 15a and 15b extending in the front-rear direction, and located to wrap the bellows-folded portions 17 and 18 in the interior I and exterior O of the bellows-folded portions 17 and 18, as shown in FIG. 4E.

If the folded airbag 11 is wrapped at predetermined positions by unillustrated wrapping member for keeping the folded-up state, the folding work of the airbag 11 is completed.

After wrapping the folded-up airbag 11 with the wrapping member, the inflator 34, the mounting brackets 31 and 35, and the cramps 37 are attached to the airbag 11 to form an airbag module. Then the airbag module is mounted on the vehicle body 1 by locating the mounting brackets 31 and 35 to predetermined positions of the inner panel 2 firstly, and inserting the bolts 32 and 36 into the mounting holes 12a and so on to secure the mounting brackets 31 and 35 to the inner panel 2. If then the front pillar garnish 4, the roof head lining 5, the rear pillar garnish 6 and the center pillar garnish 7 are attached to the vehicle body 1, the head-protecting airbag device M is mounted on the vehicle.

When the inflator 34 is actuated to discharge inflation gas G after the airbag device M is mounted on the vehicle, the inflation gas G flows into the gas passage 15 via the joint port 14 of the airbag 11, and is supplied to each of the vertical cells 16 from the gas passage 15, as indicated by double-dotted lines in FIG. 3. The airbag 11 then breaks the wrapping member that had wrapped the airbag 11, and pushes and opens the airbag cover 9 located along the lower edges of the front pillar garnish 4 and the roof head lining 5, and deploys to cover the opening W and the interior I of the center pillar CP and the rear pillar RP, while protruding downward, as indicated by double-dotted lines in FIGS. 1 and 2.

In the airbag 11, the individual vertical cells 16 are able to deploy swiftly since inflation gas G flown into the cells 16 via the joint port 14 and the gas passage 15 directly hits the lower edges 16b of the cells 16.

In the airbag 11 of the head-protecting airbag device M, a portion that inflates and covers the opening W is constituted by a plurality of cells 16 juxtaposed in the front-rear direction and having the slits 29 interposed therebetween, and thus each of the cells 16 can be folded-up separately without interfering with one another. Accordingly, the entire airbag 11 elongate in the front-rear direction is smoothly folded up even if the airbag 11 is folded in a so-called cactus fashion in which each of the interior wall 13a and the exterior wall 13b is alternately bellows-folded on crest folds 19 projecting in the surface and on valley folds 20 recessing inside the cell 16, such that bellows-folded portions 17 and 18 are formed, and the lower edge 16b is brought close to the upper edge 16a.

In the head-protecting airbag device M, therefore, the airbag 11 elongate in the front-rear direction is able to be folded by cactus-folding that enables a swift deployment, and is able to deploy swiftly when fed with inflation gas G.

In the airbag 11, in the gas passage 15 extending along the upper edge 1a of the airbag 11 and elongate in the front-rear direction, too, the interior and exterior walls 13a and 13b are respectively folded on the folds 15a and 15b along the front-rear direction and located in the interior I and exterior O of the bellows-folded portions 17 and 18 to wrap the bellows-folded portions 17 and 18. Accordingly, inflation gas flown into the gas passage 15 is able to press down the lower edges 16b of the individual vertical cells 16 immediately, and therefore, the airbag 11 is able to deploy further swiftly.

Without considering above point, it will also be appreciated that the interior wall 13a and the exterior wall 13b in the gas passage 15 are closely overlaid on each other, and bellows-folded together as a single sheet on alternate crest and valley folds, as shown in FIG. 4F.

In the airbag 11, moreover, contiguous vertical cells 16 are so joined at two positions in the lower side with one another by joint members 26 and 27 as not to be separated from one another in the front-rear direction. Accordingly, the joint members 26 and 27 help exert tension in the front-rear direction in the lower edge 11b of the entire airbag 11, cooperatively with the foremost and rearmost mounting portions 12A and 12B, which improves the occupant restraint performance in the lower edge 11b of the airbag 11.

With respect to an upper joint of the vertical cells 16, in the airbag 11, each of the joint members 27 is located in the extension of one of valley folds 20 of the interior wall 13a and exterior wall 13b in the front and rear edge portions 21 of each of the vertical cells 16.

In other words, positions of the crest folds 19 and valley folds 20 in the interior wall 13a and the exterior wall 13b are staggered from those of crest and valley folds in the front and rear edge portions 21 of each of the cells 16 of the airbag 11 by half pitches. Accordingly, front and rear ends of each of the bottoms 20a of the valley folds 20 in the interior wall 13a and exterior wall 13b become the tops 23a of crest folds 23 in the front and rear edge portions 21 of each of the cells 16. Since the tops 23a of crest folds 23 in the front and rear edge portions 21 of each of the cells 16 are formed in all of the vertical cells 16, and the tops 23a are close to each other, the tops 23a of contiguous vertical cells 16 are easily connected to each other even when the airbag 11 is cactus-folded.

Moreover, other than the joint members 27, more joint members may be located at positions along the vertical direction in the front and rear edge portions 21 in each of the vertical cells 16, as joint members 27A and 27B indicated by double-dotted lines in FIGS. 3 and 5. In this case, the vertical cells 16 are further joined and united to one another in the front-rear direction.

Figure 6:
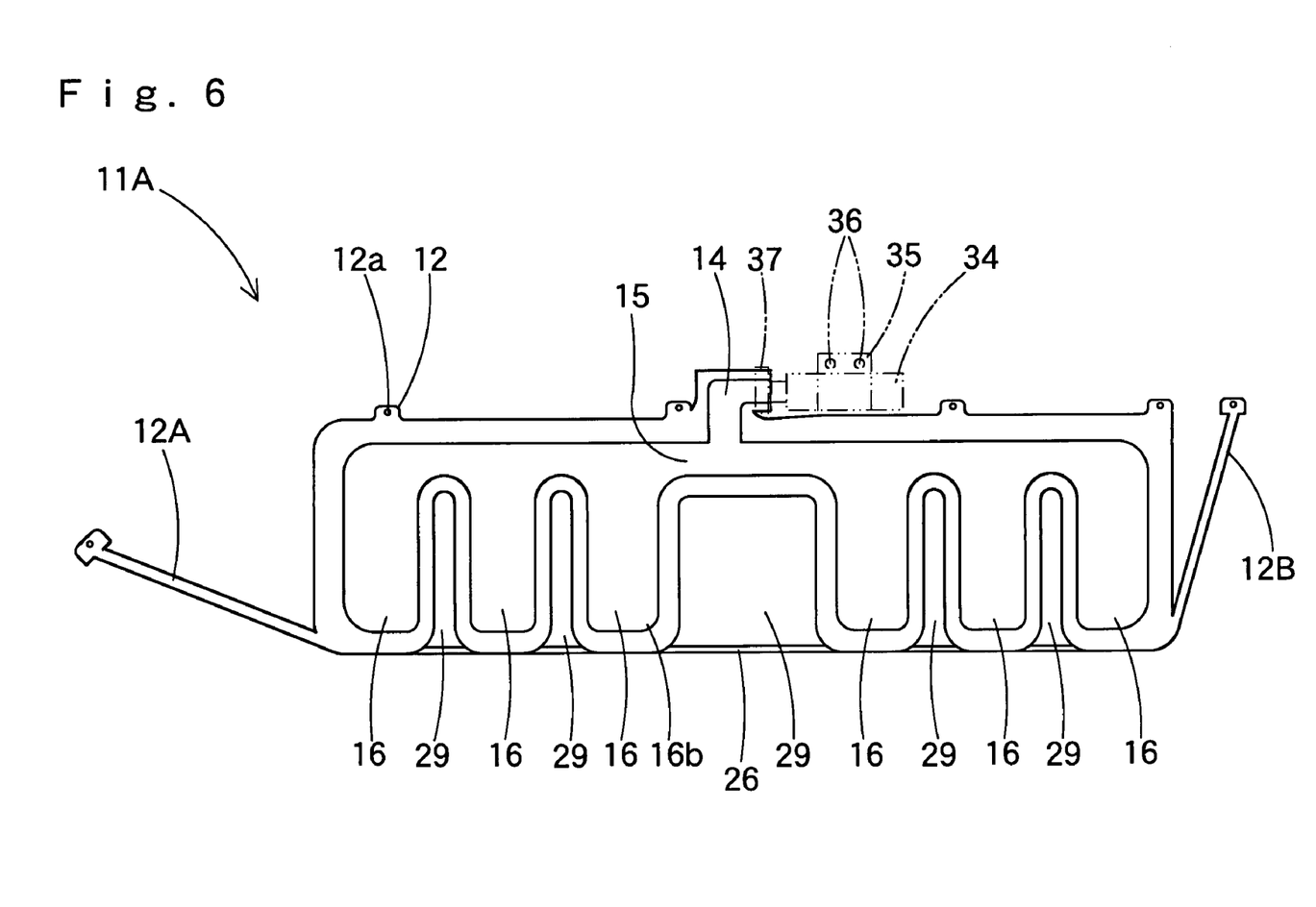
FIG. 6 is a front view of another embodiment of the airbag.

Of course, without considering the above effect, the airbag 11 having the lower edges 16b of the individual cells 16 projected downward as shown in FIGS. 4D and 4E may be provided only at the lower edges 16b with joint members 26, as an airbag 11A shown in FIG. 6.

However, if the tops 23a of crest folds in the front and rear edge portions 21 of the individual vertical cells 16 are joined to one another, clearances between the tops 23a are smaller when the airbag 11 is folded-up. Accordingly, if the joint members 27 joining the tops 23a of crest folds are short, greater tension is exerted in the front-rear direction of the vertical cells 16 when the cells 16 are inflated, so that the occupant restraint performance of the airbag 11 is further improved.

Figure 7:
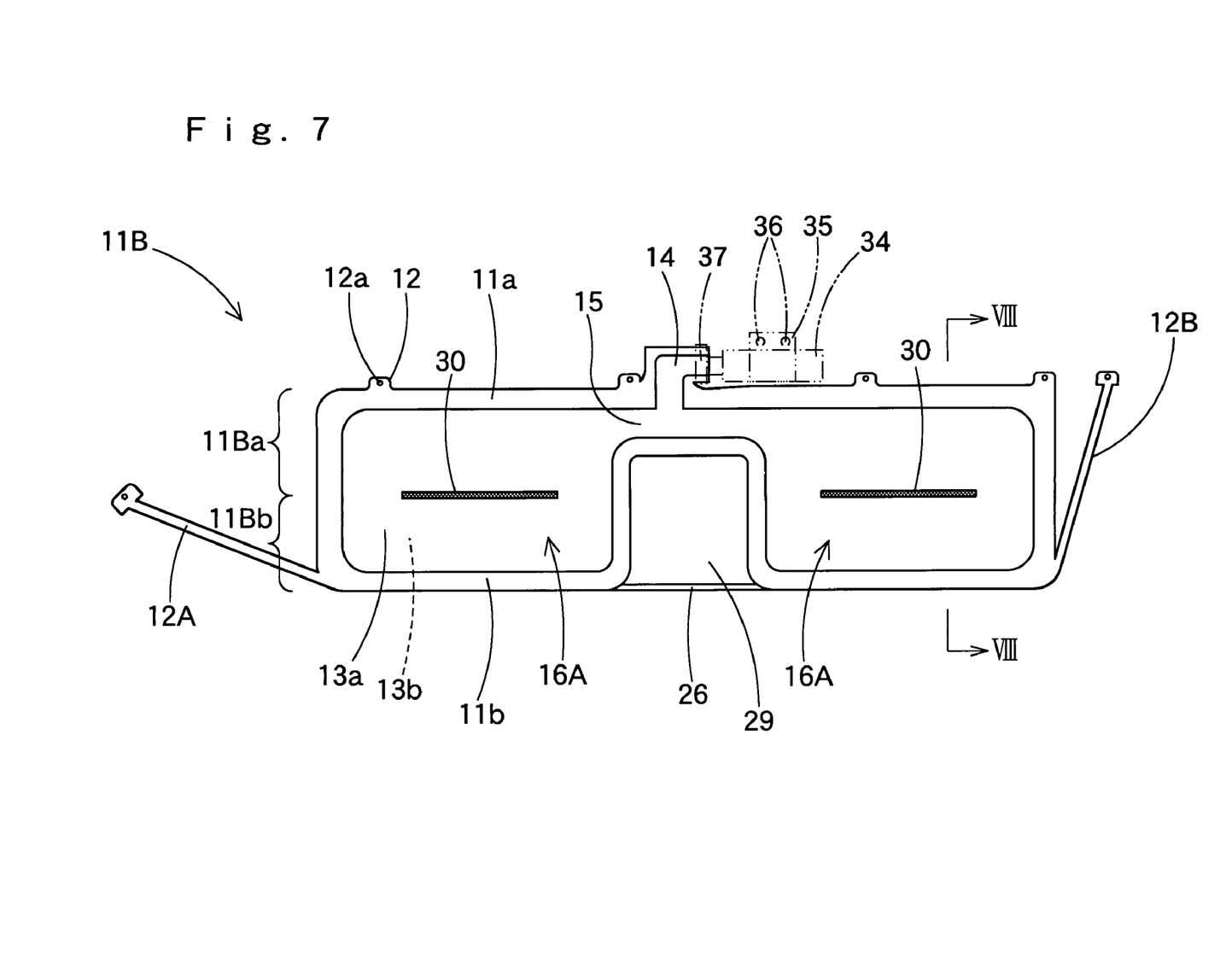
FIG. 7 is front view of still another embodiment of the airbag.
Figure 8A:
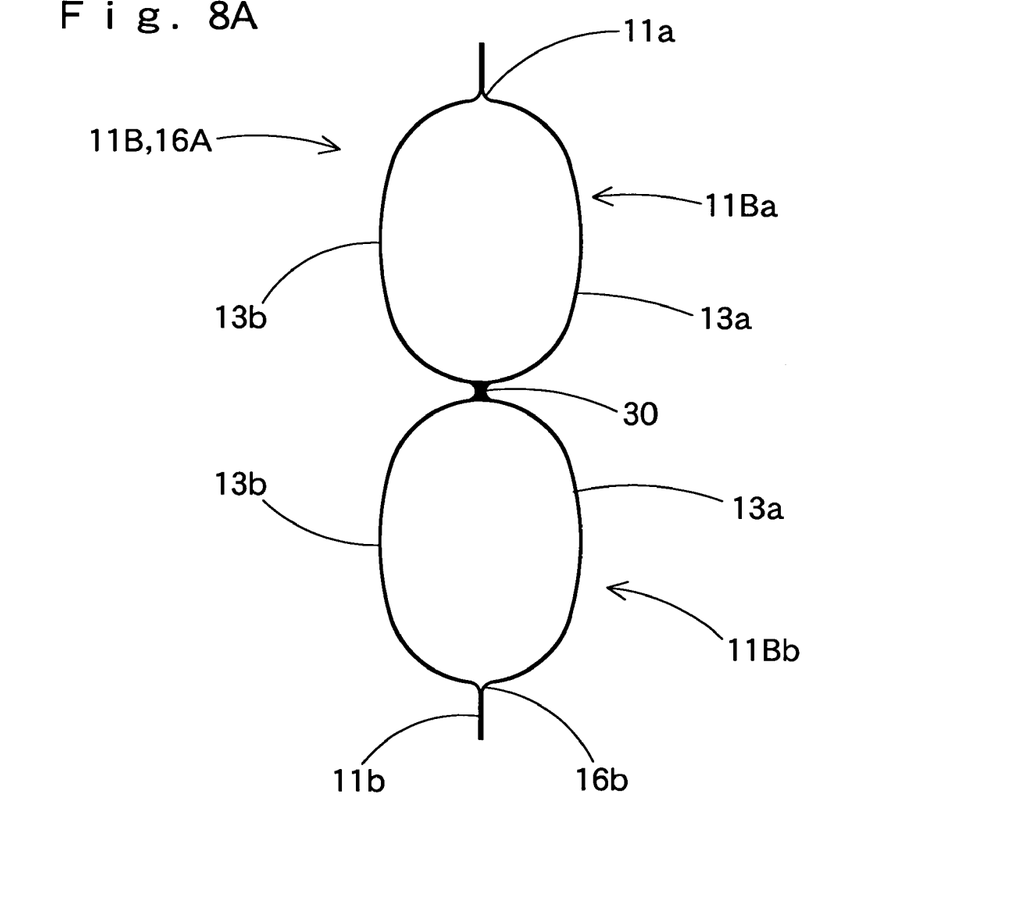
FIG. 8A is a vertical section of the inflated airbag taken along line VIII-VIII in FIG. 7.
Figure 8B:
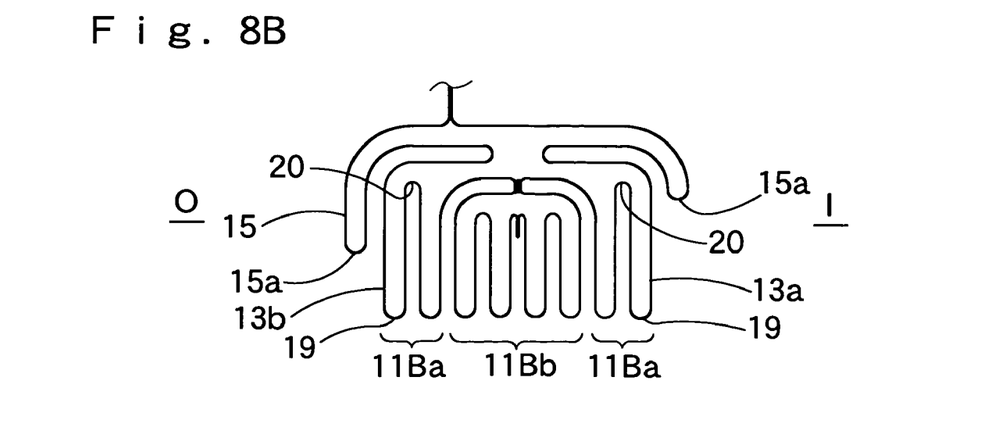
FIG. 8B is a vertical section of the folded airbag of FIG. 7, taken along line VIII-VIII in FIG. 7.

In the foregoing embodiment, each of the cells 16 to be cactus-folded has a vertically elongate shape. However, the cells may be elongate in the front-rear direction, as cells 16A shown in FIGS. 7 and 8. Each of the cells 16A may also be provided inside with a tether 30 for restraining a clearance between the interior wall 13a and the exterior wall 13b as inflated.

In that case, it is desired that the tether 30 is formed into either a linear shape extending in the front-rear direction, or a plurality of points arranged in the front-rear direction, not a vertical linear shape, such that each of the cells 16A is smoothly cactus-folded. When provided with such a tether 30, as shown in FIGS. 8A and 8B, the above-described cactus-folding is applied to a lower part 11Bb of the airbag below the tether 30, and in an upper part 11Ba above the tether 30, each of the interior wall 13a and exterior wall 13b is separately cactus-folded on crest folds 19 and valley folds 20 and located in the interior I and exterior O of the lower part 11Bb.

Although the cells 16 are joined by band-shaped joint members in the airbag 11, it will also be appreciated that the cells are provided with narrow and intermittent slits arranged along vertical direction therebetween, such that portions between the slits serve as joints of the cells.

When the joint member 27 for joining the cells is not only flexible but also elastic, it will also be appreciated that each of the cells 16 is folded to have no bellows-folded portions 22 in its front and rear edge portions 21, i.e., folded such that the entire circumference of the lower edge 16b is successively pushed inside the cell 16 while being folded on crest folds, and the elastic joint member is employed to join only the lower edges 16 of the cells 16, join positions upper and apart from the lower edges 16b, or join the lower edges 16 and upper positions. When the elastic joint members 27 are employed, the joint members 27 may join bottoms 24a of valley folds 24 in the bellows-folded portion 22 of the edge portions 21.

What is claimed is:

1. A head-protecting airbag device comprising:
   an airbag folded and housed in the upper edge of an opening inside the vehicle and deployable downward for covering the opening; and
   an inflator for supplying inflation gas to the airbag; wherein:
   the airbag includes an interior wall and an exterior wall, and a gas admissive portion provided between the interior wall and the exterior wall and capable of admitting inflation gas;
   the gas admissive portion includes:
   a plurality of cells juxtaposed in the front-rear direction of the vehicle, each of the cells, when fed with inflation gas, extending downward from the upper edge of the opening and inflating while separating the interior wall and exterior wall in the interior-exterior direction of the vehicle;
   a gas passage extending in the front-rear direction of the vehicle above the cells, the gas passage communicating each of the cells with one another; and
   a joint port connected with the inflator and located in the gas passage;
   the airbag includes each one slit between the contiguous cells, each of the slits extending from the lower edge of the airbag to the vicinity of the gas passage;
   in each of the cells, the interior wall and exterior wall are respectively folded in a bellows fashion on alternate crest folds projecting in the surface and valley folds recessing inside the cell and disposed to provide a first bellows-folded portion in the interior wall, a second bellows-folded portion in the exterior wall, and third folded portions in front and rear edge portions of the cell, whereby the airbag is folded to bring the lower edge thereof close to the upper edge, and is housed in the upper edge of the opening; and
   the first and second bellows-folded portions are disposed so that the bottoms of valley folds of the first and second bellows-folded portions lead to the tops of crest folds of the third bellows-folded portion, wherein the first and second bellows-folded portions are symmetric in the interior-exterior direction of the vehicle; and
   each pair of the contiguous cells is joined together by at least one first joint member joining the tops of the crest folds of the third bellows-folded portions at a position above the lower edge of the airbag such that the contiguous cells are not separated in the front-rear direction.

2. The head-protecting airbag device according to claim 1, wherein each pair of contiguous cells is joined together at the lower edge of the airbag by a second joint member.

3. The headprotecting airbag device according to claim 2, wherein:
   the airbag is provided along an upper edge thereof with a plurality of mounting portions for attachment to the vehicle body; and
   a foremost mounting portion and a rearmost mounting portion out of the mounting portions are formed in band shapes extending from lower ends of a foremost cell and a rearmost cell as the airbag is completely deployed, respectively, forward and rearward and away from the airbag.

4. The head-protecting airbag device according to claim 1, wherein the first joint member joins each pair of the contiguous cells at more than one positions in the vertical direction of the airbag as completely deployed.

5. The head-protecting airbag device according to claim 1, wherein:
   when the airbag is folded-up,
   each of the cells has bellows-folded portions thereof piled in the interior-exterior direction of the vehicle; and
   in the gas passage, the interior and exterior walls of the airbag are individually folded on folds along the front-rear direction of the vehicle, and located to wrap the bellows-folded portions of the cell in the interior and exterior of the cell.

6. The head-protecting airbag device according to claim 1, wherein, when the airbag is folded-up, the interior wall and exterior wall in the gas passage are closely overlaid on each other and folded in a bellows fashion together as a single sheet alternately on crest and valley folds.

7. The head-protecting airbag device according to claim 1, wherein each of the cells of the airbag is elongate in the front-rear direction and includes a tether therein for restraining a clearance between the interior wall and exterior wall.

8. The head-protecting airbag device according to claim 7, wherein;
   the tether of each of the cells is formed into either a linear shape extending in the front-rear direction or a plurality of points arranged in the front-rear direction;
   in a part of each of the cells below the tether, each of the interior wall and exterior wall is folded in a bellows fashion alternately on crest folds projecting in the surface and on valley folds recessing inside the cell; and
   in a part of each of the cells above the tether, each of the interior wall and exterior wall is folded on alternate crest folds and valley folds in the interior and exterior of the bellows-folded portion of the lower part, respectively.

* * * * *